Feb. 7, 1928.
J. W. RYAN ET AL
1,658,742
LAYING OUT TOOL
Filed July 15, 1926
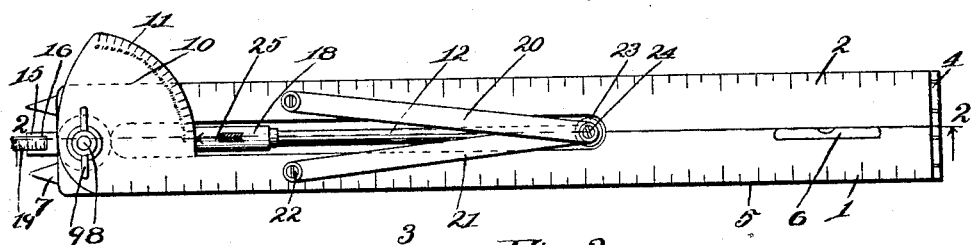
Inventor
Joseph W. Ryan
William F. Ayrton
by Hazard and Miller
Attorneys.

Patented Feb. 7, 1928.

UNITED STATES PATENT OFFICE.

1,658,742

JOSEPH W. RYAN, OF LONG BEACH, AND WILLIAM F. AYRTON, OF WILMINGTON, CALIFORNIA.

LAYING-OUT TOOL.

Application filed July 15, 1926. Serial No. 122,557.

Our invention is a laying out tool, particularly adapted for marking pipes in order to cut same to make angular connections of the sections of the pipe cut.

An object of our invention is the construction of a laying out tool which may be positioned on a pipe or the like to be cut, this tool having a pair of arms which may be positioned at the angle of a finished pipe connection, and having means to mark the pipe or form a marking rule whereby the pipe can be cut and afterwards welded on the line.

It is the custom in some types of piping work to form angular connections, elbows or the like by cutting a long section of pipe on an angle relative to the axis of the pipe and utilizing the two sections cut to weld these together, forming the desired angle or elbow. This type of joint is angular instead of being curved and may be made of any desired angle.

A particular object of our invention is forming a laying out tool with a pair of legs, either one of which may be placed on the pipe to be cut, extending longitudinally thereof and having a protractor device mounted on one of the legs with a pointer slidably mounted on a guide rod having means to retain the guide rod in the desired position to bisect the angle made by the two legs.

In addition to the above construction our invention comprises a tape mounted in alinement with the guide rod so that the tape may be drawn around the pipe at the desired angle and a marking line indicated thereon.

Our laying out tool besides being adapted for the purpose above mentioned is provided with a spirit level to be utilized in laying out or cutting pipes for a horizontal connection or the like, graduated in a measuring scale and preferably the legs are formed with a hinged or folded connection. We also provide the legs of the laying out tool with prongs so that the device may be used as a pair of dividers.

Our invention is constructed substantially as follows, having reference to the drawings, in which;

Figure 1 is a side elevation of our laying out tool in its folded or collapsed position;

Fig. 2 is a longitudinal section on the line 2—2 of Fig. 1, in the direction of the arrows;

Fig. 3 is an edge elevation as if looking at the implement in the direction of the arrow 3 of Fig. 1;

Fig. 4 is a side elevation of our laying out tool applied to a pipe to be cut;

Fig. 5 is a section through the clamping nut on the line 5—5 of Fig. 4.

In our laying out tool we provide the same with a pair of substantially similar legs 1 and 2, having extensions 3 secured thereto by hinges 4 in the ordinary manner of foldable measuring tools and having measuring scales 5 indicated thereon. A spirit level 6 may be mounted in either one of the legs and the extremities are provided with prongs 7, when it is desired to use the device as dividers. The legs are pivotally connected together by a pivot bolt 8 having a thumb nut 9 for tightening. One of the legs is provided with a plate 10 rigidly attached thereto on which is marked protractor indicia 11 giving different angles.

A guide rod 12 has an aperture 13 therethrough through which is inserted the pivot bolt 8, there being a bushing 13' and washers 14 for properly centering the bolt through the guide rod. This rod has an extension 15 beyond the pivot bolt with an aperture 16 therethrough. A tape container 17 is rigidly secured to the guide rod in any suitable manner, that shown being by means of the clamping frame 18.

The tape 19 is preferably mounted on a drum, spring controlled in the usual manner and extends through the aperture 16 for a purpose hereunder set forth. A pair of links 20 and 21 are pivotally connected to the legs by pivot pins 22 and by means of a slidable collar 23 and pivot pins 24, the free ends of the links forming a slidable connection with the guide rod.

The back of the tape mounting is provided with an indicating arrow 25 pointing to the protractor. The links 20 and 21 are each preferably formed of two straps, there being one on each side of the leg structures.

The manner of using our laying out tool in cutting pipe is substantially as follows:

Presuming a long pipe indicated by the numeral 26 is to be cut on an angle indicated by the numeral 27 so that the sections of the pipe may be connected together and form a welded pipe joint indicated by the numeral 28 in dotted lines, the laying out tool is placed on the pipe, one of the legs extending longitudinally thereof. The desired angle of cut is indicated on the protractor, the legs being opened until the pointer points at the desired angle and hence the guide rod bisects the angle between the two legs. The tape is then drawn out of the casing, passed through the aperture 16 and encircled around the pipe. In some cases it will be necessary to aline the tape by the eye with the guide rod, but in usual cutting this is not necessary.

A pencil or chalk mark or the like may then be made around the pipe, using the tape as the guide. The tape may then be rewound in the casing and the pipe cut in any suitable manner on the line indicated, the end cut off being rotated on its axis and welded to the other part at the angular joint; thereby forming an angle, elbow or the like.

Presuming a pipe occupies a somewhat vertical or sloping position and it is desired to extend the pipe therefrom at a horizontal angle, one of the legs may be placed along the fixed or standing pipe and the other leg adjusted by the spirit level to show a horizontal reading. Then the tape may be applied to the pipe and when cut and the cut off end welded to the upstanding pipe, will give a horizontal angular connection. Other adaptations of my invention will be apparent.

It is also obvious that the rule may be utilized for various measurements in connection with work on pipes or otherwise and that the device may be utilized as a divider by clamping the thumb nut 9 with the prongs any desired spaced distance apart and hence forming a compass or the like.

We have illustrated the links 20 and 21 of such length so that the two legs may be extended out into alinement. However, in many cases this will not be necessary and they may be made considerably short, if most of the angles formed are less than 120 degrees.

It will be apparent that the structural details to form our laying out tool may be considerably changed in making tools for different specific purposes. Therefore the general construction and specific details may be departed from. Such changes however, will be within the spirit of our invention as set forth in the description, drawings and claims.

It is obvious with our invention that the links 20 and 21 can be made of different lengths and a different pivotal connection with the legs so that the angle formed by the guide rod with the legs may divide the angle between the legs in any desired proportion. The proportion shown bisects such angle. Moreover, it is obvious that if our device is to be utilized as a protractor that the pair of legs not having the protractor may be omitted and have means to clamp the guide rod at the desired angle as indicated by the arrow.

Having described our invention, what we claim is:

1. A laying out tool comprising in combination, a pair of legs pivotally connected together, means to clamp said legs at a designated angle, means connected to the pivot of said legs to indicate a division of the angle between the legs, and a flexible marking guide adapted to encircle a cylindrical object in alignment with the angle dividing means, whereby the flexible marking guide may be used for marking an angle in reference to opposite sides of the cylindrical object.

2. A laying out tool comprising in combination a pair of legs connected together by a clamping bolt, a guide rod pivoted on said bolt, a pair of links connected between the legs and the guide rod, a flexible marking guide adapted to be positioned in alinement with the guide rod encircling a cylindrical object to form a guide for marking said object.

3. A laying out tool comprising in combination a pair of legs pivotally connected together by a clamping bolt, a guide rod pivoted to said bolt, the rod having an extension beyond the bolt with an aperture therethrough, a pair of links pivotally connected between the legs and the guide rod, one end of the links being slidable on the rod, an extendable tape mounted on the rod, said tape extending through the guide rod, said tape extending through the aperture and being adapted to encircle a cylindrical object to form a guide for marking.

4. A laying out tool comprising a leg having a protractor with an angle scale at the edge thereof, a clamping bolt through the center of the protractor a guide rod pivoted on the bolt, a link connected to the leg and slidably connected to the rod, a flexible marking guide mounted on the rod, bearing against said guide and adapted to encircle a cylindrical object for marking same.

5. A laying out tool comprising a pair of legs pivotally connected together by a pivot bolt, a protractor connected to one of the legs, a guide rod pivotally connetced to the bolt, links pivotally connected to the legs and slidably connected to the guide rod, and a flexible marking tape alignable with the rod to encircle a cylindrical object forming a guide for marking same.

6. A laying out tool as claimed in claim 5, the rod having an extension beyond the bolt with an aperture therethrough, the tape being mounted on a drum, the said drum being operatively connected to the rod, whereby the tape may be extended around a cylindrical object forming a guide.

7. A laying out tool comprising in combination a pair of legs, a clamping bolt pivotally connecting same, a guide rod pivoted on said bolt having an extension with a guide element therein, a protractor on one of the legs, a pair of links pivotally connected to the legs and slidably connected to the rod, a tape mounted on the rod passing through the said guide, and a spirit level mounted on one of the legs.

8. A laying out tool comprising a leg having a protractor with angles marked thereon, a clamping bolt through the center of the protractor, a guide rod pivoted on said bolt, a tape connected to said rod adapted to encircle a cylindrical object in alinement with the rod.

9. A laying out tool comprising a leg having a protractor thereon, a clamping bolt through the center of the protractor, a guide rod pivoted on said bolt having a pointer in alinement therewith, indicating angles on the protractor between the leg and the guide rod, a container having a tape mounted on the rod, and means to guide the tape around a cylindrical object in alinement with the rod.

In testimony whereof we have signed our names to this specification.

JOSEPH W. RYAN.
WILLIAM F. AYRTON.